United States Patent [19]

Shadden et al.

[11] 4,350,210
[45] Sep. 21, 1982

[54] DIKER, APPARATUS, SYSTEM AND PROCESS OF OPERATION

[76] Inventors: Oliver W. Shadden, 1501 Avenue L; Jerry W. Howard, 902 First St., both of Abernathy, Tex. 79311

[21] Appl. No.: 194,281

[22] Filed: Oct. 6, 1980

[51] Int. Cl.³ .................................................. A01B 13/16
[52] U.S. Cl. .................................... 172/143; 172/262; 172/237
[58] Field of Search ................ 172/90, 262, 540, 143, 172/528, 237, 548, 530, 529

[56] References Cited

U.S. PATENT DOCUMENTS

| | | |
|---|---|---|
| 319,727 | 6/1885 | Kauffman . |
| 2,098,738 | 11/1937 | Campbell . |
| 2,112,767 | 3/1938 | Ficken . |
| 2,187,051 | 1/1940 | Peacock . |
| 2,187,262 | 1/1940 | Brown . |
| 2,193,275 | 3/1940 | Elliott . |
| 2,196,038 | 4/1940 | Silver . |
| 2,226,575 | 12/1940 | Orelind . |
| 2,226,585 | 12/1940 | Seaholm . |
| 2,227,151 | 12/1940 | Orelind . |
| 2,233,331 | 2/1941 | Vratil . |
| 2,236,832 | 4/1941 | Nielsen . |
| 2,246,617 | 6/1941 | Christiansen ............. 172/90 |
| 2,247,788 | 7/1941 | Silver . |
| 2,249,864 | 7/1941 | Silver . |
| 2,252,593 | 8/1941 | Bruene . |
| 2,318,562 | 5/1943 | Silver et al. |
| 2,713,219 | 7/1955 | Gerrans ................. 172/237 |
| 2,780,975 | 2/1957 | Gunning . |
| 4,123,502 | 7/1980 | Gibson . |

*Primary Examiner*—Richard J. Johnson
*Attorney, Agent, or Firm*—Ely Silverman

[57] ABSTRACT

An array of several like dimensionally stable readily manufactured diking apparatuses each of which operates in a furrow automatically produces a series of dams of uniform size at regular intervals of travel by repeatedly alternating positions one of a pair of sets of (a) a forwardly disposed digging and earth gathering element and (b) a rearwardly disposed slanted support shoe that is narrower than the earth gathering element forwardly thereof, the support shoe also providing a grading action on the furrow and automatically aligning the earth gathering element.

9 Claims, 16 Drawing Figures

DIKER, APPARATUS, SYSTEM AND PROCESS OF OPERATION

BACKGROUND OF THE INVENTION

The field of art to which this invention pertains is earth working and more particularly dam forming.

DESCRIPTION OF THE PRIOR ART

The prior art of apparatus and systems providing dams in furrows for purposes of holding rain or other irrigation water in furrows at spaced intervals as have required either tripping mechanisms sensitive to distance traveled by the earth gathering element thereof, as in U.S. Pat. Nos. 319,727; 2,098,738; 2,112,767; 2,187,051; 2,193,275; 2,196,038; 2,226,575; 2,236,832, or are sensitive to the size of load gathered as in U.S. Pat. Nos. 2,226,585; 2,227,151; 2,247,788; and 2,318,562 to dump earlier gathered earth masses at intervals of length along furrows require maintenance and adjustment and are a drain in the power of the drawing units. Automatically operating apparatuses as in U.S. Pat. Nos. 2,187,262; 2,233,331; 2,252,593; 2,780,975; and 4,213,502 of the prior art wherein the load carried by the earth gathering elements thereof, in combination with the momentum action provided by towing such apparatuses behind a moving tractor, serves to empty such load gathering elements and deposit the earlier gathered earth masses, the shapes and size of the loads deposited by the earth gathering elements are variable and the distances between the dams and the heights of those dams in the same furrow vary.

SUMMARY OF THE INVENTION

A simply made structure composed of flat plates and bars firmly joined together provides an automatically and reliably repeatedly operating diking assembly. The diking assembly operates in an array of like diking assemblies, each of which diking assemblies trails behind a plow in an array of plows drawn behind a tractor moving over a field. Each diking assembly alternately positions one set of a pair of sets of cooperating diking tools; each such set comprises, in one operating position a forwardly disposed earth gathering element and a narrower locator unit rearwardly thereof. Each diking assembly moves along a furrow while a first dirt gathering element thereof gathers dirt from the sides of the furrow while it is guided along the center of such furrow by a then trailing locator unit of the same set as the first dirt gathering element, that locator unit comprising a particularly angled rigid slanted grading element. Such locator unit then also smoothes the floor of the furrow with earth removed from the furrow side walls by the first dirt gathering element. After gathering a predetermined amount of earth from the furrow the dirt gathering element automatically tilts and dumps the gathered earth and thereby forms one of a series of dams and pivots about the locator unit of the other set of earth gathering element and locator unit, following which that other set of such dirt gathering element and locator unit repeats the steps of operation of the first set of diking tools to form another of a series of like dams at equally spaced apart intervals of length in the furrow.

BRIEF DESCRIPTION OF DRAWINGS

FIGS. 5-10 form a series of representation of cyclic sequential positions of the diker assembly during its operation in the overall assembly shown in FIGS. 1 and 2.

DESCRIPTION OF THE PREFERRED EMBODIMENT

Figure 1:
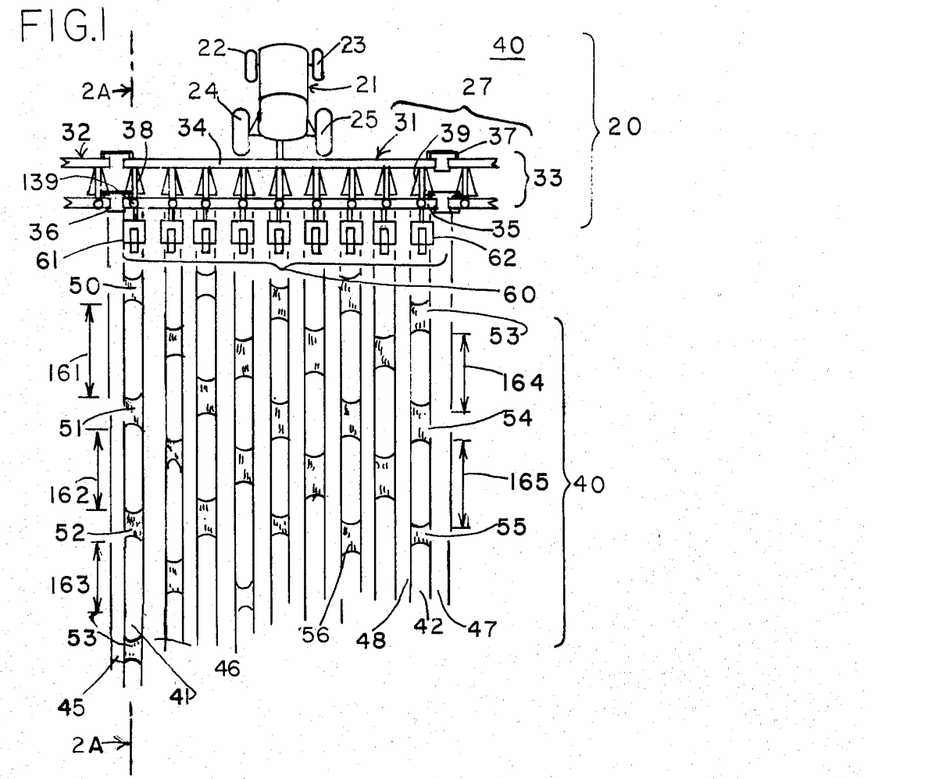
FIG. 1 is a diagrammatic plan view of a system 20 according to this invention.

The overall operative assembly 20 in which the digging assembly of this invention is utilized is shown in FIG. 1. In such overall apparatus assembly a tractor 21 having left front wheel 22, right front wheel 23, rear wheel 24 and right rear wheel 25 are connected by a hitch 26 to a tool bar assembly 27 and travels over a field 40. The tool bar assembly 27 comprises a center tool bar assembly 31, a left tool bar assembly 32, and a right tool bar assembly 33. Each tool bar assembly such as 31 has a rigid front transverse beam frame as 34 and a rigid rear transverse beam as 35 firmly joined together. Left hinge 36 pivotally connects the left tool bar assembly 31 to the center tool bar assembly 31 and right hinge 36 pivotally connects the right tool bar assembly 33 to the center tool bar assembly 31.

Each tool bar assembly 31, 32 and 33 carries a plurality of like parallel plows as 38 and 39. An array 60 of like diker assemblies as 61 and 62 is towed by the tool bar assembly 27 by attachment of the front portion of each of the individual diker assemblies as 61 and 62 to the rear of a tool bar assembly 27. Each of these diker assemblies is alike and is firmly pivotally attached to the rigid rear beam as 35 of the tool bar assembly portions as 31, 32 and 33 of assembly 27.

Each diker assembly as 61 comprises a yoke unit 63 and a plate and shoe unit 90. The yoke unit 63 comprises clevis hitch 64, a rigid horizontally and transversely extending shoulder 65 and a pair of longitudinally and generally horizontally extending arms 66 and 67. The clevis hitch 64 is pivotally firmly joined to the rear frame beam as 35 of the tool bar assembly and may have varying angles to the horizontal generally as shown in FIGS. 5-9. Each of the rigid arms 66 and 67 is firmly joined at its front end to a lateral portion of the shoulder 65 and is transversely spaced apart from the other arm to provide space therebetween for support and rotatable location of the plate and shoe unit 90. The arms 66 and 67 terminate in left and right journals 68 and 69 respectively.

The plate and shoe unit 90 comprises a plate unit 70 and a shoe assembly 80.

Plate unit 70 comprises a backing plate unit 71 and an axle 101. The backing plate unit 71 comprises a first rigid central portion 72 and a second rigid central portion 73, a first digging plate portion 74 and a second digging plate portion 75. Central plate portions 72 and 73 are both rectangular imperforate flat steel plates and extend radially from and are firmly fixed to at their central ends to the opposite sides of a stiff straight axle rod 101. Each of plate portions 74 and 75 is a rigid flat plate and is firmly and rigidly joined to the radial end of central plate portions 72 and 73 respectively. A first angled junction 76 is formed between the first digging plate 74 and the first backing plate central portion 72 and a second angled junction 77 is formed between the second backing plate central portion 73 and the second digging plate portion 75. The digging plate portions 75 and 74 are parallel to each other and are flat and the backing plate 71 is flat and rigid with its portions 72 and 73 lying in the same plane as shown in FIGS. 3-10.

The digging plates 74 and 75 terminate in a left digging plate edge 78 and a right digging plate edge 79 respectively. Edges 78 and 79 are parallel to junctions 76 and 77 respectively.

The shoe assembly 80 comprises a first locator shoe 81 and a second locator shoe 91 and struts 83-85 and 93-95.

Figure 3:
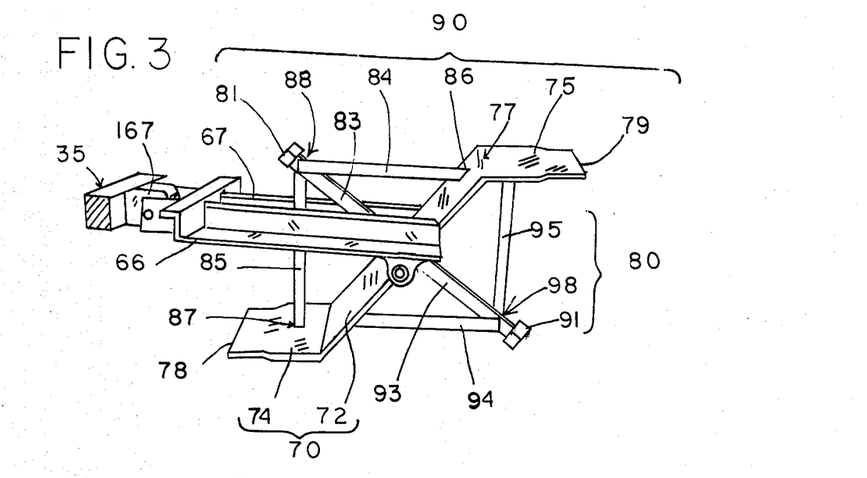
FIG. 3 is a perspective view of the diker assembly 61 in the position of parts whereat a first locator shoe 91 and a digging plate 74 are in contact with the ground.

The first locator shoe 81 and a second locator shoe 91 are the same in shape, function and size. The first locator shoe 81 is a straight rigid steel bar of rectangular cross-section the length of which extends in a line parallel to the planes of the surfaces of backing plate 71 and digging plates 74 and 75. A steel rigid first center-locator strut 83, as shown in FIG. 3, extends from the first locator shoe 81 to one upper (as shown in FIG. 3) surface of the backing plate portion 73 and is perpendicular thereto and is firmly joined to the axle bar 101. A first backing-locator strut 84 extends from the first central locator strut 83 near to the junction thereof with the first locator shoe 81 to one (left as shown in FIG. 3) face of the second portion 73 of the backing plate 71 at a junction 86 of the plate portion 73 and first backing-locator strut. A first digger-locator strut 85 extends from the junction 88 of the first central locator strut 83 and the first backing-locator strut 84 to one (top as shown in FIG. 3) face of the first digging plate 74 and joins such plate at a first digger-locator strut junction 87. The first backing-locator strut junction 86 is slightly central (and below as shown in FIG. 3) of the second digger-backing plate junction 77.

Figure 7:
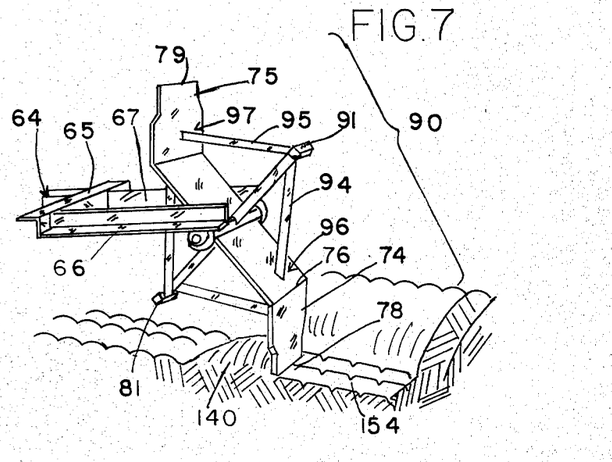
FIG. 7 is a perspective view of the diker assembly 61 in a position of parts thereof which is a position intermediate between the position of parts shown in FIGS. 6 and 8 in which the digger plates 74 and 75 are in substantially a vertical position.

The second locator shoe 91 is a straight rigid steel bar of rectangular bar cross-section, the length of which bar extends in a line parallel to the planes of the surfaces of backing plate 71 and digging plates 74 and 75. A rigid steel second center-locator strut 93 as shown in FIG. 3 extends from the second locator shoe 91 to a second (lower as shown in FIG. 3) surface of the backing plate portion 72 and is perpendicular thereto and is firmly joined to the axle bar 101. A second backing-locator strut 94 extends from the second central locator strut 93 near to the junction thereof with the second locator shoe 91 to a second (right side as shown in FIG. 3) face of the first portion 72 of the backing plate 71 at a junction 96 of the plate portion 72 and second backing-locator strut. A second digger-locator strut 95 extends from the junction 98 of the second central locator strut 93 and the second backing-locator strut 94 to one (lower as shown in FIG. 3) face of the second digging plate 75 and joins such plate at a second digger-locator strut junction 97. A second backing-locator strut junction 96 is slightly central of (and above as shown in FIG. 7) of the first digger-backing plate junction 76.

Figure 4:
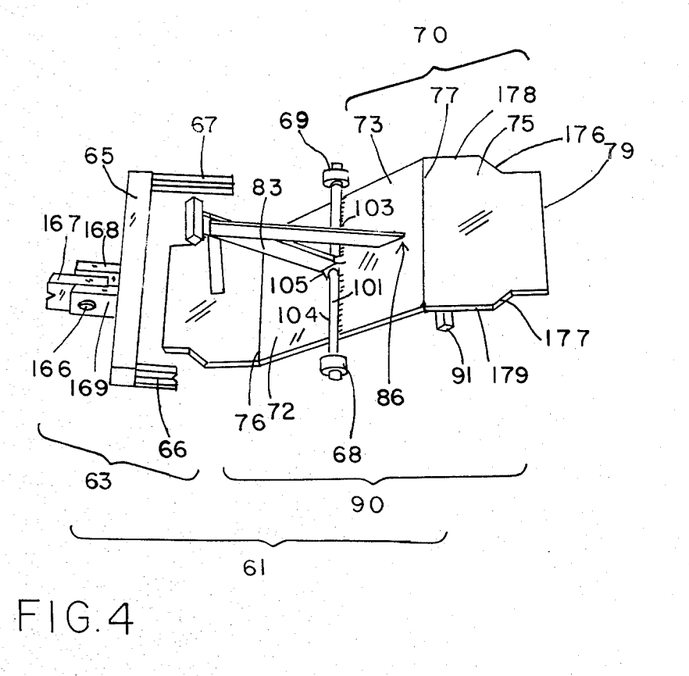
FIG. 4 is a top view of the diker assembly 61 in the position of parts as shown in FIG. 3.

A rigid straight axle 101 is, as shown in FIG. 4, firmly fixed to the central edge of the backing plate portions 72 and 73 along welded joints 104 and 103 respectively and to each central strut as 83 at a welded joint as 105.

The foot or locator shoe 81 has straight parallel edges or corners 111, 112, 113 and 114 with a surface 116 extending between the corners 111 and 112, surface 117 extending between edges 112 and 113, surface 118 extending between edges 114 and 113, and surface 115 extending between edges 114 and 111. Shoes 81 and 91 are hollow square steel bars.

The foot or locator shoe 91 has straight parallel edges or corners 131, 132, 133 and 134 with a surface 136 extending between the corners 131 and 132, surface 137 extending between edges 132 and 133, surface 138 extending between edges 134 and 133, and surface 135 extending between edges 134 and 131. Surfaces 115-118 and 135—138 are flat and of the same size. The side to side lengths of rectangular sectional shoes or bars 81 and 91 are parallel to each other and to the length of axle 101. Bars 81 and 91 also are equally spaced from that axle 101 along a straight line passing through struts 83 and 93 and those bars extend transversely for equal lengths to the left and right from a vertical plane that intersects axle 101 at its center halfway between its left and right ends and which vertical plane is transverse to the length of that axle 101 and struts 83, 84 and 85 and 93, 94 and 95 lie in that vertical plane. Struts 85 and 95 are parallel to each other and are equal in length. Struts 84 and 94 are parallel to each other and equal in length. Surface 117 of bar member 81 extends parallel to length of member 83 and surface 118 is perpendicular thereto. Surface 137 of bar 91 extends parallel to length of strut 93 and surface 132 is perpendicular thereto.

The distances from axle 101 to junctions 76 and 77 are the same. The distances from junction 76 to edge 78 is the same as the distance from junction 77 to edge 79. The width of backing plate portions 72 and 73 are the same. The sizes and the shape of digging plate 74 and 75 are the same and are oppositely directed, as shown in FIGS. 4 and 7.

Figure 5:
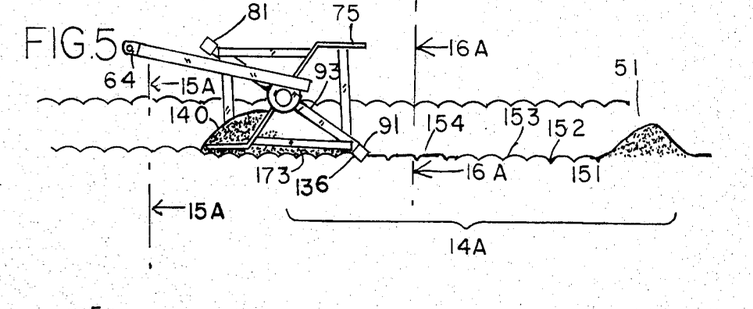
FIG. 5 is a diagrammatic side view of assembly 61 showing the position of parts of the diker apparatus as 61 during an intermediate stage of the accumulation of earth thereon to form an irrigation dam 50 in a furrow.

The flat planes 174 and 175 in which the bottom surface of digger plates 74 and 75 respectively lie in position of FIG. 5 intersect the top edge 131 and 111 of the locator bar or shoe 91 and 81 rearwardly thereof in the position of parts of assembly 61 shown in FIGS. 5 (and 14) and 10 (and 13) respectively.

Figure 8:
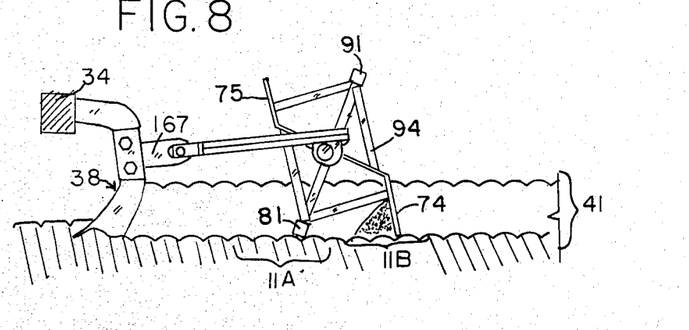
FIG. 8 is a diagrammatic side view of the position of parts of the diker assembly in a stage of operation subsequent to that stage shown in FIG. 7 and illustrates the position of parts of the diker assembly during the final stage of forming of the mass of earth composing the dam 50 while the tip of the digger plate 74 is still in contact with the ground at the bottom of the furrow and also shoes a variant of the attachment of the yoke unit 63 of assembly 60 to a tool bar assembly.

Each clevis 64 is connected by a transversely extending pin 166 to a rigid lug 167 which lug is firmly and rigidly connected to the rear tool assembly bar as 35 as shown in FIG. 3. The yoke unit as 63 of each assembly as 61 is rotatable about such pin 166 and also has some "play" or potential movement pivotally about a vertical axis passing between the arms 168 and 169 of clevis 64 and through pin 166. FIG. 8 shows a varient of the attachment of the yoke unit 63 of diker assembly 61. In the structure shown in FIG. 8 the lug 167, to which clevis 64 is pivotally attached by loose pivot pin 169, is rigidly and firmly attached to a furrow forming plow 38 which plow tool is attached to a rigid bar as 34 which is firmly attached to and drawn by a tractor as 21.

Figure 2:
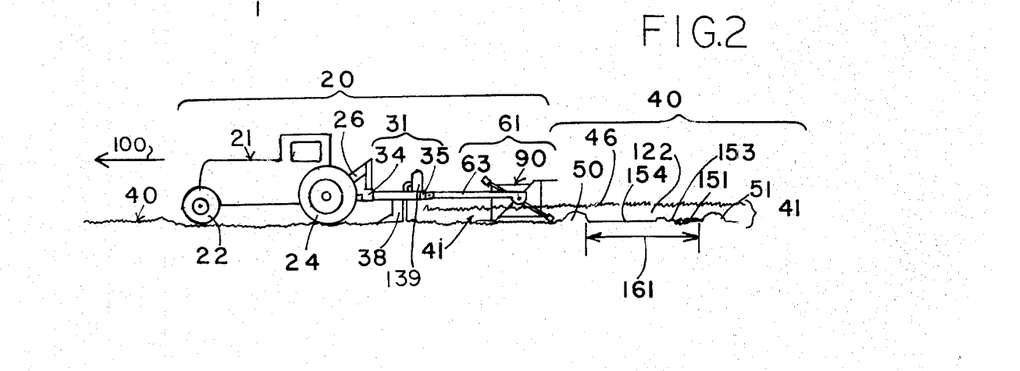
FIG. 2 is a diagrammatic elevational view of the system 20 shown in FIG. 1 along the vertical plane 2A—2A of FIG. 1.
Figure 6:
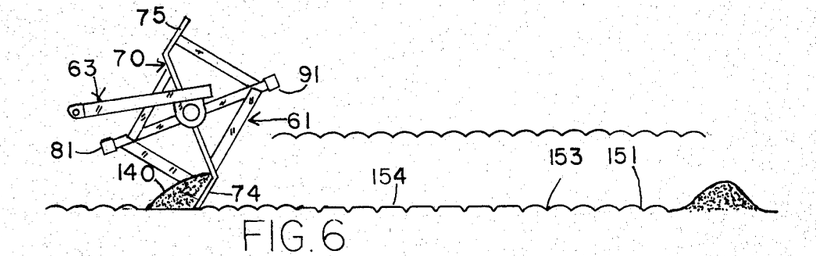
FIG. 6 shows the position of parts of the diker assembly in a stage of cyclic operation which is subsequent to that stage shown in FIG. 5 and which is a stage wherein the mass of earth forming the dam is more fully formed than in FIG. 5 and the locator shoe 91 is raised above the level of the bottom of the furrow.
Figure 13:
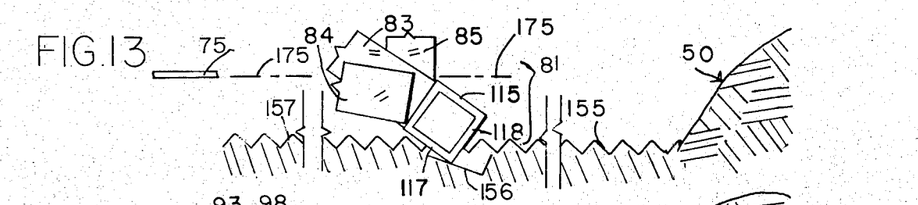
FIG. 13 shows portions of the furrow 41 and parts of apparatus shown in zones 13A and 13B of FIG. 10.
Figure 14:
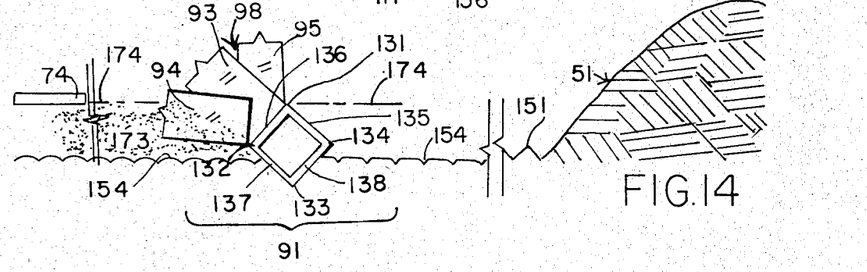
FIG. 14 is an enlarged view of portions of furrow 41 and of apparatus 61 shown in zone 14A of FIG. 5.

In the operation of the diker assembly 61 as shown in FIGS. 5 to 14 inclusive, the diker assemblies as 61 of array 60 are mounted in trailing position behind furrow-forming implements, such as, for example, the plow 38 in a position to ride in the furrow as 41 formed by the furrow-forming tools as 38 as they move forward in a direction 100 behind the tractor 21, such tractor connected by a tool-bar assembly to each of such plows. During the initial movement of the diker assembly along the furrow 41 a digger plate as 74 in FIGS. 3 and 5 is located in its load-accumulating position with the bar 91 and the bottom face of the plate 74 in engagement with the bottom and sides of the furrow 41 and with the leading edge 78 of the plate 74 upwardly spaced of the bottom of the furrow as shown in FIGS. 13 and 14. As the diker assembly is pulled along the furrow behind the plow in its load-accumulating position (FIGS. 2, 3 and 5) soil from the sides of the furrow falls inwardly on the upper face of the digger plate 74. When a sufficient load has been accumulated on the plate 74, the leading edge 78 thereof is forced downwardly into engagement with the bottom 123 of the furrow 41 to thereby cause the plate and shoe unit 90 to rotate as a unit in a counterclockwise direction as shown in FIGS. 5-10. This rotation of the plate and shoe unit 90 causes the digger plate 74 to move rearwardly relative to the axle 101 as shown in FIG. 6 and turn into inverted position to thereby dump the accumulated soil 140 in the form of a dam or dike 50 across the furrow 41. The dumping position of the diker assembly 61 is substantially that shown in FIG. 8 wherein the leading edge 78 of the plate 74 and the bar 81 are both engaged with the bottom of the furrow of 41.

Figure 9:
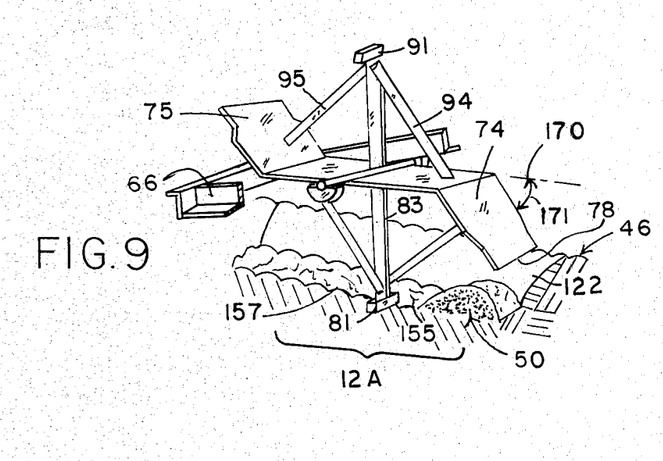
FIG. 9 is a perspective showing of the position of parts of the diker assembly 61 when that apparatus is in a stage of operation immediately following the position of parts shown in FIG. 8. Only the front part of the left arm 66 of the yoke assembly unit 63 is shown in this figure. The rest of that arm and journal attached thereto are not shown in this figure for purpose of clarity of representation of other components of diker assembly 61.
Figure 10:
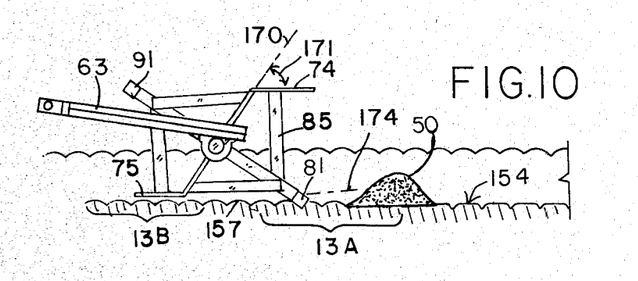
FIG. 10 shows the position of parts of the apparatus 61 at a stage of operation of the apparatus 61 subsequent to that stage shown in FIG. 9 and wherein the digger plate, 74, theretofore in contact with the ground, is raised to an elevated position and the digger plate 75 theretofore, as shown in FIGS. 5 and 6, in an elevated position is brought into contact with the ground for the initial stage of accumulation of earth to form yet another dam and a second cycle of the operations shown in FIGS. 5 through 9 starts.

From this dumping position the shoe and plate unit 90 continues to rotate in a counterclockwise direction as viewed in FIG. 8 until, after passing through position of parts shown in FIG. 9, it is disposed in the position shown in FIG. 10. This latter position is a load-accumulating position for the digger plate 75 wherein the positions of the digging plates 74 and 75 and the shoes 81 and 91 relative to the furrow 41 are reversed from the positions in which they are located when the plate 74 is disposed in its load-accumulating positions as shown in FIG. 5.

As the tractor 21 of assembly 20 moves forward the diker assemblies of array 60 move forwardly along the furrows as 41 and 42 and the load-accumulating and load-dumping cycle is repeatedly performed to form a series of dams as 50, 51, 52 and 53 in furrow 41 and in the other furrows of the array of furrows in the field 40.

In view of the loose connection of the clevis 64 of yoke unit 63 to the tool assembly 27 the diking assembly freely follows the furrow formed by the furrow forming tool. The orientation of each assembly as 61 is maintained automatically relative to the furrow therefor, as 41 by the self-aligning character of the diker assembly 61. More particularly, the action of the locator bars as 81 and 91 when rearwardly located as shown in FIGS. 10 and 5 respectively act as a rudder and so aligns each assembly as 61 in its travel along the trough therefor because the width of such bars is less than the edge of the digger plate then in front of it (as 75 and 74 respectively) and also because the angle of repose with which the lower surfaces as 117 and 137 of such locator bars make with the earth immediately therebelow and because of the downwardly tapered slope of the trough and that the bar is sufficiently wide to contact the side walls of the furrow therefor.

The plate and shoe unit 90 is a firm unit and is dimensionally stable and maintains its symmetry about axle 101 and journals 68 and 69 during and after repeated use because of the firm and rigid welded attachment of the struts to the plate assembly 70 and to the locator shoes and to other struts and the dimensional stability of the axle 101 the plate unit 70, struts, and locator shoes, whereby the dynamic characteristics and uniform operation of the plate and shoe unit 90 and assembly 61 are maintained after repeated use diker assembly 61 is drawn as by tractor 21 and the tool bar assembly 27.

Figure 11:
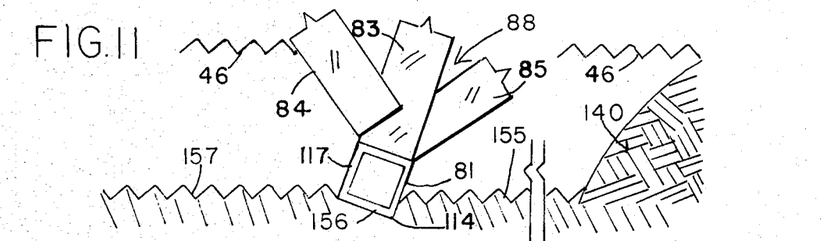
FIG. 11 is an enlarged showing of the portions of furrow 41 and the assembly 61 shown in zones 11A and 11B of FIG. 8.
Figure 12:
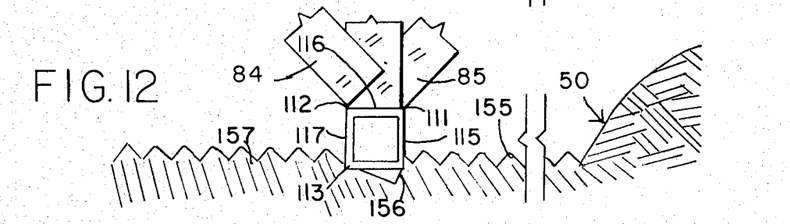
FIG. 12 is an enlarged view of portions of furrow 41 and of apparatus shown in zone 12A of FIG. 9.

The shape of edge 114 of the locator bars of assembly 61 also provides a sharp impact and engagement with the earth so each bar is firmly held against slippage in counterclockwise direction as shown in FIG. 11. Thereby the momentum of the counterclockwise (as shown in FIGS. 5-10) rotating plate and shoe unit 90 caused by the relative rearward motion of each loaded digger plate as 74 relative to the axle 101 moving in the forward direction (100 in FIG. 2) is positively used to bring the following digger plate, as 75 in FIGS. 9 and 10, sharply in contact with the ground in regular and reliable fashion. Also, the flat surfaces as 118 and 138 of bars 81 and 91 are large enough relative to the weight of the plate and shoe unit 90 and strength of the ground that the forward and upward edges as 113 and 133 of the bar surfaces 118 and 138, which bar surfaces initially contact the ground as shown in FIG. 11, are not buried in the ground. Thereby the locator shoes or bars 81 and 91 are automatically and readily drawn out of the area of contact as 156 (FIG. 11) with the ground, especially as the initial area of contact of such surfaces 118 and 138 is at an angle with the horizontal that is less than the angle of repose of the earth.

While each locator bar as 91 or 81 is to the rear of digger plate as 74 or 75 as in FIGS. 5 or 10, respectively, each such locator bar, because it is narrower than the front edge of the digger plate forward thereof and is firmly held in relation to that digger plate by a rigid strut as 93 or 83 respectively and the rigid attachment of such strut to the front central portion 72 (or 73) of the backing plate unit 71, with such strut, acts as a rudder while acting on and utilizing slanted and rough adjacent furrow walls. The locator bars then act to maintain the direction and location of the notwithstanding the repeated tumbling and bumping to which assembly 61 is subjected during its operation in the field.

A conventional seeding apparatus as 139 is connected in conventional manner with each plow as 38 of the tool bar assembly 27. The seeding apparatus 139 is usually firmly attached to and supported by the tool bar assembly and regularly discharges seeds behind the plow into the furrow formed by each of the plows as 38 in the array of plows so that each of the furrows as 41 and 42 and dams therein are located over the seeds automatically placed beneath such furrows.

Figure 15:
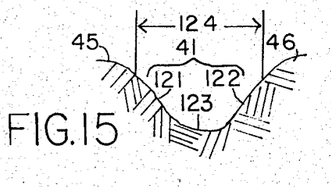
FIG. 15 is a transverse vertical section view along the vertical section 15A—15A of FIG. 5.
Figure 16:
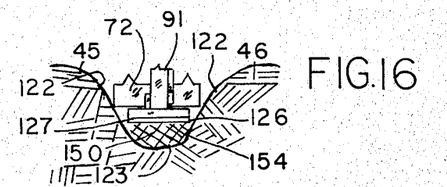
FIG. 16 is a transverse vertical section view along the vertical section 16A—16A of FIG. 5.

In its operation as shown in the sequence of positions of parts shown in FIGS. 5-14, each diker assembly as 61 of array 60 provides alternate and successive location of its locator shoes as 81 and 91 and its digging plates as 74 and 75 in the furrow therefor as 41. Because of the crumbly nature of the earth on the rough sidewalls as 121 and 122 of the generally V-shaped or trapezoidal shaped furrows as 41 as shown in FIGS. 15 and 16 and because the left side-to-right-side length of the square-sectioned bars as 81 and 91 forming each locator shoe is narrower than the side-to-side width of the front edge as 79 of the digger plate 74 rearwardly thereof (as shown in FIG. 6) and less than the width, 124, of the furrow, while each locator bar is in front of the digger plate engaging the ground, as it is in the position shown in FIGS. 8 and 9, it serves to direct and orient the plate and shoe unit 90 during the forwardly traversing motion of such unit 90 to travel along the center of the downwardly tapered rough-surfaced furrow as 41 between the hillocks as 46 and 48 created by the action of the plow, as 38, in front of that particular diking unit. Locator bar or shoe 81 then fixes the direction and path of the following digger plate as 75 on the rough furrow floor as 123 and relative to the rough furrow walls as 121 and 122 by providing that the position of the center of the axle 101 is maintained above the center of the furrow along which the path of travel of the front edge (78 or 79) of the digger plate in front of it (74 or 75) along the center of the trough, as 41, along which the diker assembly 61 travels because as the locator bar moves (transversely to its forward direction of travel along the length of furrow 41) more to the right side wall 122 than to the left vertical side wall of the trough 41; as shown in FIG. 16 the motion in the forward direction (100) of that edge is slowed down while the other edge moves forward freely, so that the plane in which the struts 83-85 and 93-95 lie is brought parallel to the length of the furrow 41. Also, as the surfaces 118 and 138 of the locator bars 81 and 91 that contact the earth on the vertically extending sloped sides of the trough extend at angles to the horizontal that are less than the angle of repose of such earth, the locator bars readily slide toward the center of the V-shaped trough or furrow between the side walls or hillocks as 45 and 46 while being drawn forward (in direction of arrow 100 in FIG. 2) in each trough.

When each digger plate as 74 has travelled along the trough 41 for a sufficient distance to accumulate enough earth, as at mass 140 in FIGS. 5-7, to form the major portion of the mass required to form a dike as 50 (shown in FIGS. 9 and 10) such digger plate has then travelled horizontally long enough along the floor of trough 41 for the locator bar to the rear thereof, as 91, to be located, as shown in FIG. 5, on a portion of the earth as 154 which has been contacted by and accordingly acted upon by the bottom surface of that digger plate (74). Such portion of earth, 154, at the bottom of the trough is smoother than the portions of earth as 151, 153, 155 and 157 on the floor of the trough or furrow created by the action of the plow as 38. Such rough portions 151, 153, 155 and 157 are located (as shown diagrammatically as at 151 and 153 in FIGS. 5 and 6 and to scale at portions indicated as 157 in FIG. 9 and 155 and 157 in FIG. 10) between a locator shoe as 81 and a digger plate as 74 rearwardly thereof at the position of parts of assembly 61 as shown in FIGS. 8 and 9 and 10 for location 155 and in FIG. 10 for location 157. At like locations 151 and 155 and like locations 153 and 157 a digger plate as 74 or 75 does not contact the earth adjacent to the like portions of the trough floor (as 152 and 156) on which the locator bar initially rests briefly after its downward motion from position of parts of assembly 61 shown in FIG. 8 to the position of assembly 61 parts shown in FIG. 9. In such smoother portions as 154 and 158 of the floor of the trough, the lower front and forwardly and upwardly slanted surface as 137 of the ground contacting locator shoe or bar 91 meets the upper surface of the trough floor at an angle less than the angle of repose of the earth and accordingly easily glides or rides or slides over such surface (as in position of parts shown in FIGS. 5 and 14 for bar 91) because of the greater, horizontally measured, distance of the center of bar 91 from the center of axle 101 than the vertically measured distance of that bar 91 below the horizontal level of the axle 101. The same freely sliding motion and the same relationship of forwardly and upwardly slanted surface 117 of bar 81 in its ground contacting position exists in the position of parts after the bar 81 has moved leftward of the position thereof shown in FIG. 13. Such movement of each locator bar relative to the furrow or trough floor surface results in that each locator bar moves upwardly from the position of parts shown in FIG. 5 for bar 91 to the position of parts shown in FIG. 6 without frictional resistance by the ground contacting bar as 91 to such movement when the load of earth as 140 on the then loaded digger plate as 74 and back plate central portion, as 72 as in FIG. 7, is sufficient to cause the backing plate unit 71 to begin to rotate (counterclockwise as shown in FIGS. 6-8) about the axle 101. This movement of the backing plate unit 71 of each diker assembly as 61 occurs repeatedly as each mass as 140 reaches a certain volume and height and such movement is not substantially affected by variable factors such as moisture or clay content of the earth that determine the amount of frictional engagement of such ground with the slanted supporting element such as the locator bar 81 and 91 that follows each such loaded digger plate. Thereby substantially only the mass of the material required to form the small dams or dikes as 50–56 and the speed of the tractor control the movement of the structures that support the earth increments as 140 that form the dams as 50 and 51 above discussed and illustrated. The dams as 50, 51, 52 and 53 are thereby formed at regular intervals of length, as 161 and 162 and 163, along the length of each furrow, as 41, as each diker assembly as 61 travels along such furrow at a fixed speed and dams as 53, 54 and 55 are formed at regular intervals of length, as 164 and 165, respectively along the length of other furrows as 42 as a diker assembly, as 62, travels along each such other furrow (42) at a fixed speed. As the diker assembly 61 moves more rapidly or more slowly the intervals as 161 between the dams as 50 and 51 are all shorter or longer respectively at a fixed size of diker assembly and fixed weight of the yoke unit 53. As the weight of the yoke unit 63 applied to the axle 101 increases and decreases the interval of length between dams or dikes as 50–55 increases and decreases respectively.

During the traversing and rotating movement of the diker assembly 61 from the position of parts shown in FIGS. 5 and 10 the digger plates and adjoining parts of the backing plates produce a spray of finely divided particles of earth above the locator bars behind such digger plates. However the earth below the locator bars 81 and 91 in troughs as 41 is denser and more firm that the dust-like or air suspended dirt above such locator bars. Consequently the force between the upwardly and forwardly (leftwardly in FIGS. 2 and 5–14) sloped surfaces as 117 and 137 support the locator bars above the earth's surface in the furrows and prevents those bars from being buried and from developing frictional forces between such earth and the locator bar as would prevent the locator bars from freely moving upwardly when a predetermined amount of earth as 140 is gathered on the digger and adjacent central portion of the backing plate, as in FIG. 6.

In the overall the orientation of the surfaces as 117 and 137 of the locator shoes 81 and 91 provides a hydroplaning or sliding action of the locator shoes or bars over the earth at the bottom of the furrows. When plowing is usually done the earth is dry and the flow characteristics of the earth when so broken and pulverized by plowing are fairly constant within a narrow range of flow characteristics. Thereby each of the like digger assemblies in assemblies as 20 provide for a series of dams, as 50–53 by assembly 61 and 54 and 55 by assembly 62 all of such dams being of like size, shape and spacing; as 161–165, when all assemblies as 61 of array 60 are of the same size and shape and all plows as 38 and 39 of assembly 27 are of the same size and shape. Because all the dams as 50–53 produced by operation of each of the like diker assemblies as 61 of array 60 have the same size and shape and the longitudinal intervals between such dams in any one furrow are the same there is no development of cycles of high stress on the tool bar as 35 drawn by the tractor 21 resulting from the action of several of the diker assemblies producing concurrently maximum tensile stress at one moment in their operating cycle, with concurrent and undesirable deacceleration of the tool-bearing assembly 27 as might disadvantageously affect the plowing operation.

The plow 38 is usually one that produces a furrow where the bottom of the furrow is a slightly rounded V-shape having vertically extending and laterally slanted side walls as 121 and 122 adjacent small hills or hillocks as 45 and 46 as in FIGS. 15 and 16. The digging plate edges, as 178 and 179, when disposed in a load accumulating position, as in FIGS. 5 and 10 ride on the side walls 121 and 122 in spanning relation thereto while the narrower locator bar as 81 then therebehind is located at a somewhat lower elevation on or near the bottom of the furrow floor. The forward motion of plates 74 and 75, in positions of FIGS. 5 and 10 respectively, disrupts the walls of the furrow and dirt or soil from the side walls fall inwardly to the upper surface of the digger plate as 74 and 75. As the walls of the trough are in major part initially formed of irregularly shaped but generally equiaxial clumps of earth usually ¼ inch to 3 inches in average diameter as well as dust, the edges 79 and 176–179 of each plate as 75 (in position of FIG. 10) produce a mass of loose small soil particles that pass under the plate 75 as well as over it and behind the central backing plate portion 73 adjacent to that digger plate as well as in front of that backing plate portion. Such loose particles form a relatively freely flowable mass behind the junction as 77 of the digger plate as 75 in contact with the ground, and adjacent backing plate portion as 73. As shown in FIGS. 5 and 14 such flowable and formable particulate mass 173 is contacted and smoothed by the forwardly and upwardly slanted or sloped surface as 137 and adjacent lower edge, as 133 of the locator bar 91 trailing behind the digger plate 74. The flowable fine particles of soil (produced by the action of the digger plate on the furrow side walls and passing rearwardly of the then lower backing plate portion and then lower digger plate) are thereby formed or graded into a layer (150 in FIG. 16) having a relatively smooth or flat top surface whereby the resulting dams as 50 and 51 are located on the ends of furrow portions of which the floor is relatively smooth and at least far smoother than the floor of such furrows prior to such action by the digger plates and locator bars.

Thus, in position of parts shown in FIGS. 10 or 5 respectively the weight of assembly 61 to the rear of axle 101 rests on edge 113 of bar 81 or edge 133 of bar 91 and adjacent surface portions of the bar during motion of the assembly 61 forward (left in FIGS. 5–14). The bottom edge, as 113 of bar 81, of each locator bar then acts as a grader to distribute evenly over the rough furrow floor surface therebelow the particles of soil torn from the furrow side walls by the digger plate (in front of the locator shoe).

Such action of edges 113 and 133 creates between the dams in each of the neighboring dams (as 50 and 51, 51 and 52, and 52 and 53) in one furrow floors that are relatively smooth or flat and even; such flat-bottomed or floored furrows between such dams that are spaced apart by even intervals provide subsequent even water distribution to plants located nearby to such dammed areas.

The struts 83–85 are light in weight and their vertical surfaces act as a rudder in the loose semifluid particulate mass of dirt 173 overlying the more solid mass of earth below such loose mass and which solid mass is located to the rear of plate 74.

The major portion of the weight of plate and shoe assembly 90 is in the plate elements 72, 73, 74 and 75. The struts 83–85 and 93–95 and shoes 81 and 91 are relatively light compared to the weight of such plate elements. Thereby the masses of earth as 140 forming the dikes as 50 and 52 are effective to easily and rapidly invert the shoe and plate unit 90.

Each digger plate as 75 is narrower at its front edge as 79 than at its junction as 77 with the backing plate portion thereto connected and each digger plate as 75 has beveled edges as 176 and 177 between that front edge and that junction in order to better center such digger plate in the trough when operating as in FIGS. 10 and 14.

The orientation of the struts as 95 and 85 in planes approximately halfway between journals 68 and 69, which planes are perpendicular to the axis of symmetry and axis of rotation of the plate and shoe unit 90 provided by the longitudinal axis of axle 101, results in that the position of locator-digger struts as 85 and 95 during the formation of masses as 140 from which a dam or dike as 50 is formed by the action of plate and shoe unit 90, as shown in FIGS. 5 and 6 does not harm the completed dam, as shown in FIG. 9, notwithstanding the attachment and presence of the digger-locator struts 85 and 95 on the digger plates on which the masses of earth 140 are gathered. This lack of harm results from the fact that, in operation of the shoe and plate unit 90 as above described and shown the mass 140 of theretofore particulate flowable solid material of which each such dam is formed "heals" or returns substantially and effectively to a stable continuous undisrupted mass or volume or condition by reason of flow of the particles of earth forming the mass 140 transverse to the plane perpendicular to the axis of symmetry of plate and shoe unit 90 when the flat sided digger locator struts as 85 and 95, which are thin from side to side and wide in the vertical plane, are drawn upwardly through such mass 140 during the movement of the plate and shoe unit 90 from its position as shown in FIG. 5 to its position in FIGS. 6 and 7 and 8 and 9. Accordingly the simply made, sturdy and dimensionally stable structure of the plate and shoe unit 90 does not interfere with the dam formation due to inclusion of elements 95 and 85 especially as the distances of the digger plate edges 78 and 79 and the distances of bars 81 and 91 from the center longitudinal axis of axle 101 and the angle between the center-locator struts 83 and 93 and the backing plate central portions and digging plates are sufficiently large that the axle 101 and all portions of the surfaces of the locator bars 81 and 91 and center-locator struts 83 and 93 and plate 70 bridge over the dams as 50 and 51 formed by the digger plates. In the preferred embodiment of unit 90 of which dimensions are given in Table I herebelow, the angle between the length of strut 83 (which is formed of a straight thin bar) and adjacent flat plates 73 and 72 is 90 degrees and the distance (a) from center longitudinal axis of axle 101 to each edge as 78 is 16½ inches (41.9 cm) and the distance (b) from the center longitudinal axis of axle 101 to each surface as 118 of bar 81 is 13 inches (33 cm). Thus there is only a 25-30 percent difference in length between the distances (a) and (b) and the height of the axle 101 above the bottom of the furrow as in position of parts shown in FIG. 8 where the mass 140 is bridged by plate and shoe unit 90 is 12½ inches (31.8 cm).

In operation of the assembly 20 with such assembly 20 moving in the forward direction as 100 at a speed of 2 to 7 miles per hour (3.2-11.3 kilometers/hour) each of the diker assemblies as 61 in an array 60—the dimensions of such diker assemblies being as set out in Table I herebelow—produce dams or dikes as 51-56 over the entire array 60 and/or 50-53 in each furrow as 41 each such dam being 6 to 7 inches high (15-18 cm.) over the floor of the furrow and with uniform intervals as 161, 162 between dams of 4-5 feet (1.2-1.5 meters).

The set of tools or elements comprising the locator shoe 81 and edge 78 of digger plate 74 and a plane drawn therebetween, and the set of tools or elements comprising the locator shoe 91 and the edge 79 of the digger plate 75 and a plane drawn therebetween all [shoe, edges, planes] extend further from axle 101 than the height of the dam formed by each such set, and each of such shoes and edges are more distant from each other than the distance from the rear edge (right side in FIGS. 5–10) to front edge (left side in FIGS. 5–10) of the base of the dam (measured at the level of the floor of the trough) formed by earth gathered on each such shoe. The assembly 61 thus automatically positively positions the earth gathering elements as 74 and 75 on one side of the dam and positions a locator shoe as 81 or 91 on the other side of the dam and pivots the shoe and plate unit about that locator shoe, whereby the locator shoes do not disturb the dam theretofore formed because the locator shoes and plates as shown in FIG. 8 bridge over the dams, as 50, formed by each such plate, as 74, and the other locator shoe, as 91, therebehind (in position of parts shown in FIG. 5) prior to that plate pivoting as shown in FIG. 9 about the locator shoe as 81, with which as shown in FIG. 8, such plate forms a bridge over the dam 50.

A table of dimensions of parts of a preferred embodiment of diker assembly 61 is set out in Table I herebelow.

TABLE I

DIMENSIONS OF COMPONENTS OF APPARATUS 61

| Item | Characteristic & Description | Dimension In. | Dimension Cm. |
|---|---|---|---|
| Strut 83 | to surface 116 of bar 81 from surface of plate 72 | 12½ | 31.8 |
| Plate portion 72 | joint 104, where plate 72 joins axle 101, to junction 76 | 9¼ | 23.5 |
| Plate 74 | junction 76 to edge 78 | 8¾ | 22.2 |
| Strut 94 | junction 96 on plate 72 to edge 133 of bar 91 | 15½ | 39.4 |
| Strut 95 | junction 97 on plate 75 to edge 132 of bar 91 | 15 | 38 |
| Plates 72-75 | width | 12 | 30.5 |
| Plate 73 | thickness | ¼ | .64 |
| Axle 101 | diameter | 1 | 2.54 |
| 101 | length | 18 | 45.7 |
| Bar 81, 91 | length | 4 | 10.2 |
| 81 | edge 111 to 112 and edge 113-114 | 1 | 2.54 |
| 81 | edge 112 to 113 and edge 114-111 | 1 | 2.54 |
| Struts 83, 84, 85 and 93-95 | width (made of steel) | 1 | 2.54 |
| | thickness | 3/16 | .48 |
| | | Measurement | |
| Junction 76 | angle 171 between digging plate 74 and central backing | 50° | |

TABLE I-continued

DIMENSIONS OF COMPONENTS OF APPARATUS 61

| Item | Characteristic & Description | Lb.-Oz. | (Kg.) |
|---|---|---|---|
| | plate portion 72 measured from extension of plane of plate 74 (FIG. 9) | | |
| Angle | between strut 94 and strut 95 | 87° | |
| Angle | angle of strut 95 to plate 75 at junction 97 | 90° | |
| Angle | angle of strut 85 to plate 74 at junction 87 | 90° | |
| Unit 90 | weight of digging plate and backing plate unit (also referred to as shoe and paddle unit 90) | 41 - 0 | (18.6) |
| Unit 70 | weight of backing plate unit 70 | 15 - 0 | (6.8) |
| Struts 83-85 | weight of struts 83, 84, 85, total | 2 - 12 | (1.25) |
| Axle 101 | weight of axle 101 | 4 - 0 | (1.8) |
| Bar 81 | weight of locator bar or shoe 81 | 0 - 8 | (.23) |
| Unit 63 | weight of yoke unit 63, total | 33 - 0 | (15) |
| Plate 74 and Shoe 91 | total weight on plate 74 and shoe 91 in horizontal position of yoke as in FIG. 3 | 59 - 4 | (26.8) |
| Pin 166 | weight borne on clevis pin 166 in horizontal position of yoke as in FIG. 3 | 16 - 12 | (7.6) |
| Shoe 91 | weight borne on shoe 91 in horizontal position of yoke as in FIG. 3 | 29 - 10 | (13.4) |

We claim:

1. A diker assembly comprising:
   (a) a yoke, said yoke comprising a transverse member and longitudinal arms attached to said transverse member, and
   (b) a digging plate and backing plate unit, said digging blade and backing plate unit comprising a first, upper, backing plate portion, a second, lower, backing plate portion and a first, upper, digging plate portion and a second, lower, digging plate portion, a first locator shoe and a second locator shoe, and rigid struts connecting said locator shoes and said digging plate and backing plate unit, said plate portions being flat and rigid, said digging and backing plate unit rotatably connected to said arms of said yoke at the center of said digging plate and backing plate unit,
   (c) said first, upper, backing plate portion extending transversely and in a plane forward and downward, said first digging plate extending transversely and in a second flat horizontal plane forming an angle to said first, lower, backing plate portion and said second, upper, backing plate portion extending transversely and in a plane extending rearward and upward and said second digging plate extending transversely and in a third plane and connected to and forming an angle to said second backing plate portion, said first digging plate portion and said second digging plate portion being parallel to each other,
   (d) a first strut extending rearwardly and downwardly from said digging plate and backing plate unit and a second strut comprising a rigid beam extending forwardly and upwardly therefrom,
   (e) said first locator shoe attached to said first strut at the rear and lower end thereof and extending horizontally and forwardly and leftward and rightward transversely of said strut, and said second locator shoe attached to said second strut at the front and upper end thereof and extending horizontally and rearwardly and transversely leftward and rightward of said second strut, each said strut being thin from side-to-side and wide in the vertical plane,
     (i) said first locator shoe having a lower edge extending transversely below the plane of said first digger plate, and
     (ii) a surface of said first locator shoe extending upwardly and forwardly from said lower edge of said first locator shoe,
     (iii) said second locator shoe having an upper edge extending transversely above an extension of said plane of said second digger plate and,
     (iv) a surface of said second locator shoe extending downwardly and rearwardly from said upper edge of said second locator shoe,
   (f) said digging plate and backing plate unit and said shoes and struts being symmetrical about the center of said backing plate unit halfway between said digging plate portions, and
   (g) each locator shoe being located in a position determined by the intersection of (i) a first straight line perpendicular to the plane of the backing plate at the center thereof, and (ii) a second straight line perpendicular to the flat plane of a digger plate, and in which position the distance from the tip of said digger plate to the locator shoe forward thereof is greater than the distance from the center of the backing plate to the locator shoe forward of said digger plate.

2. Apparatus as in claim 1 wherein each of said first and second struts extends substantially at a right angle to said backing plate.

3. Apparatus as in claim 2 and comprising also an axle on said backing plate and a journal on each of said yoke arms, said axle rotatably located in said journals and fixed to said digging plate and backing plate unit between said first backing plate portion and said second backing plate portion.

4. Apparatus as in claim 3 wherein a first horizontal strut extends from said first backing plate portion adjacent said junction of said first digger plate and said first portion of said backing plate to a portion of said first strut near to said first locator shoe and a first vertical strut extends from said second digger plate to said portion of said first strut near to said first locator shoe and a second horizontal strut extends from said second backing plate portion adjacent said junction of said second digging plate and said second backing plate portion to a point on said second strut near to said second locator shoe and a second vertical strut extends from said first digger plate to said portion of said first strut near to said second locator shoe.

5. Apparatus as in claim 4 wherein said first strut has a greater height than width and said second strut has a greater height than width.

6. Apparatus as in claim 5 wherein said first vertical strut extends longitudinally for its width and extends transversely thereto for its thickness and said width is greater than its thickness and wherein said second vertical strut extends longitudinally for its width and extends transversely thereto for its thickness and said width is greater than its thickness.

7. A plowing and diking system comprising a tractor, a tool bar assembly, an array of plows, and an array of diking assemblies, said tractor attached to said tool bar assembly, said tool bar assembly comprising a rigid transversely extending beam said plows attached to said beam said diking assemblies attached to and drawn behind said tool bar assembly and said diking assemblies disposed behind each one of said plows in said array of plows, each of said diker assemblies comprising (a) a yoke, said yoke comprising a transverse member and longitudinal arms attached to said transverse member, and (b) a digging plate and backing plate unit, said digging blade and backing plate unit comprising a first, upper, backing plate portion, a second, lower, backing plate portion and a first, upper, digging plate portion and a second, lower, digging plate portion, a first locator shoe and a second locator shoe, and rigid struts connecting said locator shoes and said digging plate and backing plate unit, said plate portions being flat and rigid, said digging and backing plate unit rotatably connected to said arms of said yoke at the center of said digging plate and backing plate unit, (c) said first, upper backing plate portion extending transversely and in a plane forward and downward, said first digging plate extending transversely and in a second flat horizontal plane forming an angle to said first, lower, backing plate portion and said second, upper, backing plate portion extending transversely and in a plane extending rearward and upward and said second digging plate extending transversely and in a third flat horizontal plane and connected to and forming an angle to said second backing plate portion, said first digging plate portion and said second digging plate portion being parallel to each other, (d) a first strut extending rearwardly and downwardly from said digging plate and backing plate unit and a second strut comprising a rigid beam extending forwardly and upwardly therefrom, (e) a first locator shoe attached to said first strut at the rear and lower end thereof and extending horizontally and forwardly and leftward and rightward transversely of said strut, and said second locator shoe attached to said second strut at the front and upper end thereof and extending transversely leftward and rightward of said second strut, each said strut being thin from side-to-side and wide in the vertical plane, (i) said first locator shoe having a lower edge extending transversely below the plane of said first digger plate, and (ii) a surface of said first locator shoe extending upwardly and forwardly from said lower edge of said first locator shoe, (iii) said second locator shoe having an upper edge extending transversely above an extension of said plane of said second digger plate and, (iv) a surface of said second locator shoe extending downwardly and rearwardly from said upper edge of said second locator shoe, (f) said digging plate and backing plate unit and said shoes and struts being symmetrical about the center of said backing plate unit halfway between said digging plate portions, (g) each locator shoe being located in a position determined by the intersection of (i) a first straight line perpendicular to the plane of the backing plate at center thereof, and (ii) a second straight line perpendicular to the flat plane of a digger plate plate in which position the distance from the tip of said digger plate to the locator shoe forward thereof is greater than the distance from the center of the backing plate to the locator shoe forward of said digger plate.

8. Apparatus as in claim 7 wherein a first horizontal strut extends from said first backing plate portion adjacent said junction of said first digger plate and said first portion of said backing plate to a portion of said first strut near to said first locator shoe and a first vertical strut extends from said second digger plate to said portion of said first strut to said first locator shoe and a second horizontal strut extends from said second backing plate portion adjacent said junction of said second digging plate and said second backing plate portion to a point on said second strut near to said second locator shoe and a second vertical strut extends from said first digger plate to said portion of said first strut near to said second locator shoe, said first strut has a greater height than width and said second strut has a greater height than width, and said first vertical strut extends longitudinally for its width and extends transversely thereto for its thickness and said width is greater than its thickness and wherein said second vertical strut extends longitudinally for its width and extends transversely thereto for its thickness and said width is greater than its thickness.

9. Apparatus as in claim 7 wherein each of said first and second struts extends substantially at a right angle to said backing plate.

* * * * *